United States Patent
Toeroe

(10) Patent No.: US 11,818,019 B2
(45) Date of Patent: Nov. 14, 2023

(54) ACHIEVING REQUESTED SERVICE AVAILABILITY

(71) Applicant: Maria Toeroe, Montreal (CA)

(72) Inventor: Maria Toeroe, Montreal (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/774,776

(22) PCT Filed: Oct. 30, 2020

(86) PCT No.: PCT/IB2020/060224
§ 371 (c)(1),
(2) Date: May 5, 2022

(87) PCT Pub. No.: WO2021/090133
PCT Pub. Date: May 14, 2021

(65) Prior Publication Data
US 2022/0407785 A1    Dec. 22, 2022

Related U.S. Application Data

(60) Provisional application No. 62/932,853, filed on Nov. 8, 2019.

(51) Int. Cl.
*H04L 41/342* (2022.01)
*H04L 41/5054* (2022.01)
(Continued)

(52) U.S. Cl.
CPC ........ *H04L 41/5025* (2013.01); *G06F 9/5077* (2013.01); *H04L 41/342* (2022.05); *H04L 41/5009* (2013.01); *H04L 41/5054* (2013.01)

(58) Field of Classification Search
None
See application file for complete search history.

(56) References Cited

U.S. PATENT DOCUMENTS

| | | |
|---|---|---|
| 2016/0212017 A1* | 7/2016 | Li .................. H04L 41/5048 |
| 2017/0083374 A1* | 3/2017 | Yin ................. G06F 9/5077 |

(Continued)

FOREIGN PATENT DOCUMENTS

| | | |
|---|---|---|
| CN | 108462592 A | 8/2018 |
| CN | 107005480 B | 7/2020 |

(Continued)

OTHER PUBLICATIONS

ETSI GR NFV-REL 007 V1.1.2 (Oct. 2017), Network Function Virtualisation (NFV);Reliability; Report on the resilience of NFV-MANO critical capabilities.

(Continued)

*Primary Examiner* — Kevin T Bates
*Assistant Examiner* — Dae Kim
(74) *Attorney, Agent, or Firm* — Julie Dufort; Ericsson Canada Inc.

(57) ABSTRACT

The disclosure relates to a method, executed by an NFV-MANO, for providing a requested Service Availability Level (SAL) for a Network Service (NS). The method comprises at each of a plurality of layers of the NFV-MANO, mapping the requested SAL to a SAL that needs to be provided by a lower layer of the NFV-MANO. The method comprises propagating the mapped requested SAL through interfaces between layers of the NFV-MANO, from an NFVO towards a VIM. The method comprises receiving an estimated SAL' for the NS based on virtual resources (VR) allocated by the VIM for satisfying the requested SAL. The method comprises, upon determining that the estimated SAL' does not satisfy the requested SAL, taking actions to meet the requested SAL, or upon determining that the estimated SAL' satisfies the requested SAL taking no further actions.

21 Claims, 8 Drawing Sheets

(51) Int. Cl.
   *H04L 41/5025*   (2022.01)
   *G06F 9/50*   (2006.01)
   *H04L 41/5009*   (2022.01)

(56) References Cited

U.S. PATENT DOCUMENTS

| | | | | |
|---|---|---|---|---|
| 2018/0062945 A1* | 3/2018 | Ni | ........................ | H04L 41/5045 |
| 2018/0077031 A1* | 3/2018 | Chen | .................... | H04L 41/5051 |
| 2019/0173964 A1* | 6/2019 | Ni | ........................ | H04L 41/5054 |

FOREIGN PATENT DOCUMENTS

| | | |
|---|---|---|
| CN | 107624230 B | 12/2020 |
| CN | 109565657 B | 2/2021 |
| EP | 3471345 A1 | 4/2019 |
| WO | 2018041345 A1 | 3/2018 |

OTHER PUBLICATIONS

ETSI, "Network Functions Virtualisation (NFV) Release 3; Management and Orchestration; Network Service Templates Specification", GS NFV-IFA 014 V3.3.1, Sep. 2019.

ETSI, Network Functions Virtualisation (NFV) Release 3; Management and Orchestration; Functional requirements specification, GS NFV-IFA 010 V3.3.1 (Sep. 2019).

ISR and Written Opinion, dated Jan. 29, 2021, from corresponding application PCT/IB2020/060224.

* cited by examiner

700 ⤵

| 701 | propagating the requested SAL through interfaces between layers of the NFV-MANO, from the NFV Orchestrator (NFVO) to the Virtualised Infrastructure Manager (VIM) |

↓

| 702 | mapping the requested SAL received from an upper layer to a SAL that need to be provided by a lower layer |

↓

| 703 | propagating a requested Infrastructure Reliability Level (IRL) |

↓

| 704 | mapping the requested IRL received from an upper layer to an IRL that need to be provided by a lower layer |

↓

| 705 | the NFVO determining SAL and IRL needed for Virtual Network Functions (VNFs) and Virtual Links (VLs) constituting the NS, respectively VNF(SAL) and VL(IRL), to achieve the requested SAL for the NS, and providing the VNF(SAL) to the VNF manager (VNFM) and the VL(IRL) to the VIM |

↓

| 706 | the VNFM determining IRL for VRs, VR(IRL), allocated to execute the VNFs, to achieve the requested SAL for the NS, and providing the VR(IRL) to the VIM |

↓

| 707 | the VIM allocating virtual resources for the NS that satisfy the requested SAL |

↓

| 708 | propagating estimated SAL (SAL') from a lower layer towards an upper layer of the NFV-MANO and comparing the estimated SAL' with the requested SAL |

↓

| 709 | the VIM providing estimated Virtual Resource Infrastructure Reliability Level, VR(IRL'), to the VNFM and Virtual Link (VL) IRL, VL(IRL'), to the NFVO |

↓

| 710 | the VNFM estimating SAL of the VNF, VNF(SAL'), based on the provided VR(IRL') and providing the estimated SAL' to the NFVO |

↓

| 711 | the NFVO estimating SAL of the NS, the NS(SAL'), based on the VNF(SAL') provided by the VNFM and on the VL(IRL') provided by the VIM |

↓

| 712 | upon determining that the estimated SAL' does not satisfy the requested SAL, taking actions to meet the requested SAL |

Figure 7

ACHIEVING REQUESTED SERVICE AVAILABILITY

PRIORITY STATEMENT UNDER 35 U.S.C. S.119(E) & 37 C.F.R. S.1.78

This non-provisional patent application claims priority based upon the prior U.S. provisional patent application entitled "ACHIEVING REQUESTED SERVICE AVAILABILITY", application No. 62/932,853, filed Nov. 8, 2019, in the names of Maria Toeroe.

TECHNICAL FIELD

The present disclosure relates to Service Availability Level in the context of Network Functions Virtualisation.

BACKGROUND

European Telecommunications Standards Institute (ETSI) Network Functions Virtualisation (NFV) defines itself as the home of the definition and consolidation for NFV technologies. It goes on stating that modern telecoms networks contain an ever-increasing variety of proprietary hardware. The launch of new services often demands network reconfiguration and on-site installation of new equipment which in turn requires additional floor space, power, and trained maintenance staff.

In a digital world, the innovation cycles accelerate and require greater flexibility and dynamism than hardware-based appliances allow. Hard-wired network with single function boxes is tedious to maintain, slow to evolve, and prevent service providers from offering dynamic services.

In the same way that applications are supported by dynamically configurable and fully automated cloud environments, virtualized network functions allow networks to be agile and capable to respond automatically to the needs of the traffic and services running over it.

Key enabling technologies for this vision include Software Defined Networking (SDN) and Network Functions Virtualisation. SDN and NFV are complementary but increasingly co-dependent. While the former provides the means to dynamically control the network and the provisioning of networks as a service, the latter offers the capability to manage and orchestrate the virtualization of resources for the provisioning of network functions and their composition into higher-layer network services.

FIG. 1 is a schematic illustration of the NFV architecture framework with related specifications, all included herein by reference.

FIG. 2 is a schematic illustration of the NFV-Management and Orchestration (MANO) 105 architectural framework with reference points, comprising the following elements, as described in the ETSI specification.

NFV Orchestrator (NFVO) 110 is a functional block with two main responsibilities:
  the orchestration of Network Functions Virtualization Infrastructure (NFVI) resources across multiple VIMs, fulfilling the Resource Orchestration (RO) functions described in clause 4.2 of ETSI GS NFV-MAN 001 [i.4];
  the lifecycle management of Network Services (NS), fulfilling the Network Service Orchestration functions described in clause 4.4 of ETSI GS NFV-MAN 001 [i.4].

VNF Manager (VNFM) 120 is a functional block with the main responsibility for the lifecycle management of VNF instances as described in clause 4.3 of ETSI GS NFV-MAN 001 [i.4].

Virtualised Infrastructure Manager (VIM) 130 is a functional block with the main responsibility for controlling and managing the NFVI compute, storage and network resources.

Operations Support Systems (OSS)/Business Support Systems (BSS) 140 is a functional block representing the combination of the operator's other operations and business support functions that are not otherwise explicitly captured in the architectural diagram.

EM 150 is a functional block with the main responsibility for Fault-management, Configuration, Accounting, Performance, and Security (FCAPS) management functionality for a VNF.

NFVI 160 is a functional block representing all the hardware (e.g. compute, storage, and networking) and software (e.g. hypervisors) components that together provide the infrastructure resources where VNFs are deployed.

VNF 170 is a functional block representing the Virtualised Network Function.

In Release-3 of the ETSI NFV IFA specifications, the feature of Service Availability Level (SAL) has been added so that resources are selected and assigned to a requested network service according to the service availability committed by the service provider. In this solution, the NFV Orchestrator user (e.g. OSS) can request the SAL of a requested NS by specifying in the NS descriptor (NSD) either the SAL of the NS or the SALs of its constituents, i.e. the VNFs and the Virtual Links (VLs). Based on this information, when requested, the NFVO grants resources of appropriate categories/types so that that the SAL for the NS NS(SAL) can be met.

SUMMARY

In the ETSI NFV IFA specifications, it is not defined how the NFVO achieves that a service availability requested for a network service is satisfied and maintained throughout its deployment. This includes, but is not limited to, the decision of the NFVO to grant appropriate virtualized resources, the VIM deciding on the placement of those virtualized resources on physical resources, the VIM and the VNFM healing VNFs after physical resource failure, etc.

There is provided a method, executed by a Network Function Virtualisation (NFV)-Management and Orchestration (MANO), for providing a requested Service Availability Level (SAL) for a Network Service (NS). The method comprises at each of a plurality of layers of the NFV-MANO, mapping the requested SAL to a SAL that needs to be provided by a lower layer of the NFV-MANO; propagating the mapped requested SAL through interfaces between layers of the NFV-MANO, from an NFV Orchestrator (NFVO) towards a Virtualised Infrastructure Manager (VIM); receiving an estimated SAL' for the NS based on virtual resources (VR) allocated by the VIM for satisfying the requested SAL; and upon determining that the estimated SAL' does not satisfy the requested SAL, taking actions to meet the requested SAL, or upon determining that the estimated SAL' satisfies the requested SAL taking no further actions.

There is provided a system running a Network Function Virtualisation (NFV)-Management and Orchestration (MANO), for providing a requested Service Availability Level (SAL) for a Network Service (NS), comprising processing circuits and a memory. The memory contains instructions executable by the processing circuits whereby the system is operative to: at each of a plurality of layers of the NFV-MANO, map the requested SAL to a SAL that needs to be provided by a lower layer of the NFV-MANO; propagate the mapped requested SAL through interfaces between layers of the NFV-MANO, from an NFV Orchestrator (NFVO) towards a Virtualised Infrastructure Manager (VIM); receive an estimated SAL' for the NS based on virtual resources (VR) allocated by the VIM for satisfying the requested SAL; and upon determining that the estimated SAL' does not satisfy the requested SAL, take actions to meet the requested SAL, or upon determining that the estimated SAL' satisfies the requested SAL take no further actions.

There is provided a non-transitory computer readable media having stored thereon instructions for providing a requested Service Availability Level (SAL) for a Network Service (NS) through a Network Function Virtualisation (NFV)-Management and Orchestration (MANO). The instructions comprise: at each of a plurality of layers of the NFV-MANO, mapping the requested SAL to a SAL that needs to be provided by a lower layer of the NFV-MANO; propagating the mapped requested SAL through interfaces between layers of the NFV-MANO, from an NFV Orchestrator (NFVO) towards a Virtualised Infrastructure Manager (VIM); receiving an estimated SAL' for the NS based on virtual resources (VR) allocated by the VIM for satisfying the requested SAL; and upon determining that the estimated SAL' does not satisfy the requested SAL, taking actions to meet the requested SAL, or upon determining that the estimated SAL' satisfies the requested SAL taking no further actions.

The method and system or node provided herein present improvements to the way software availability level operate in ETSI NFV.

BRIEF DESCRIPTION OF THE DRAWINGS

FIG. 7 is a flowchart of a method for achieving requested service availability.

DETAILED DESCRIPTION

Various features will now be described with reference to the figures to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed, these may be illustrated using dashed lines.

Figure 3:
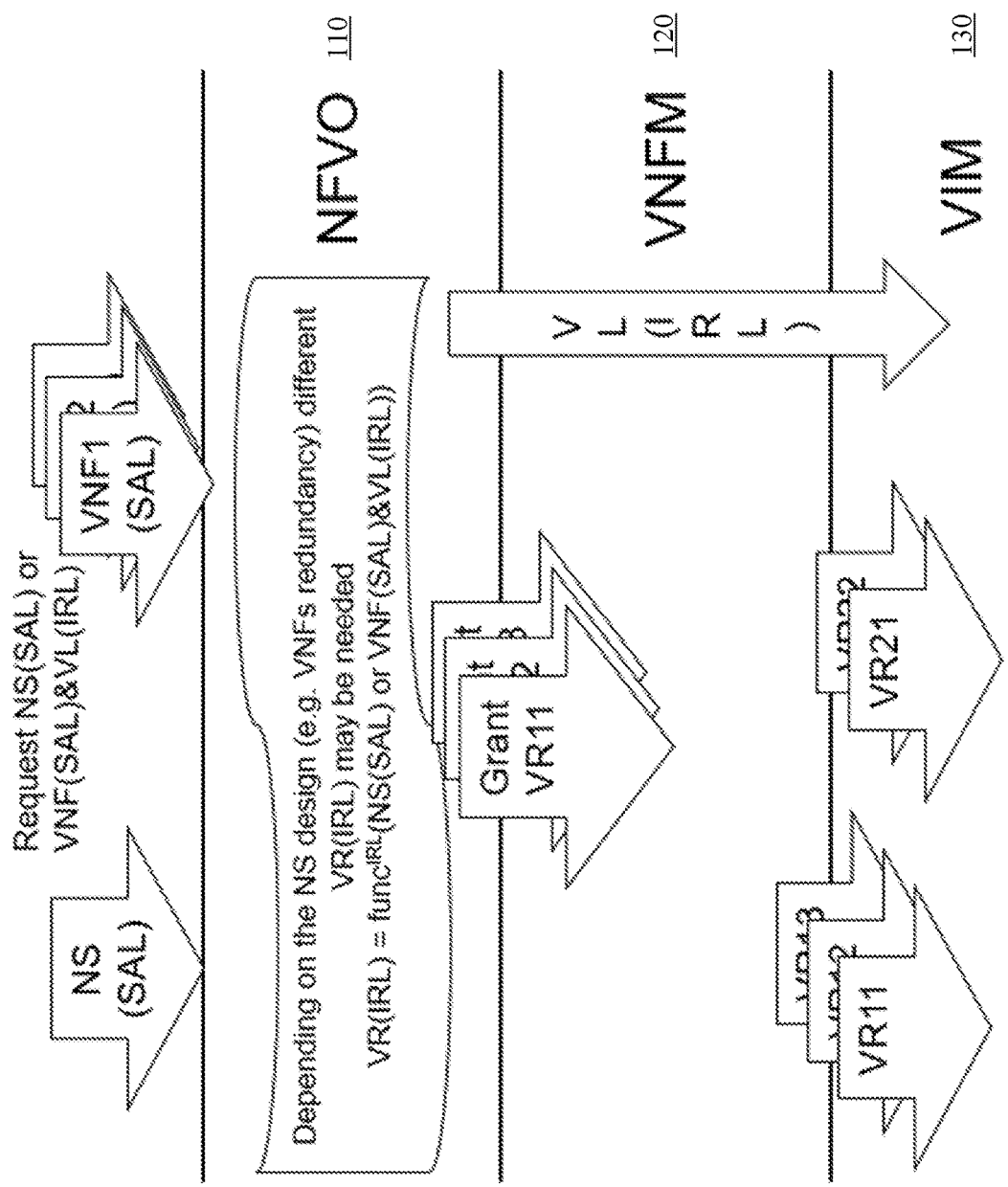
FIGS. 3 and 4 are schematic illustrations of the current Service Availability Level described in the ETSI NFV IFA specifications.
Figure 4:
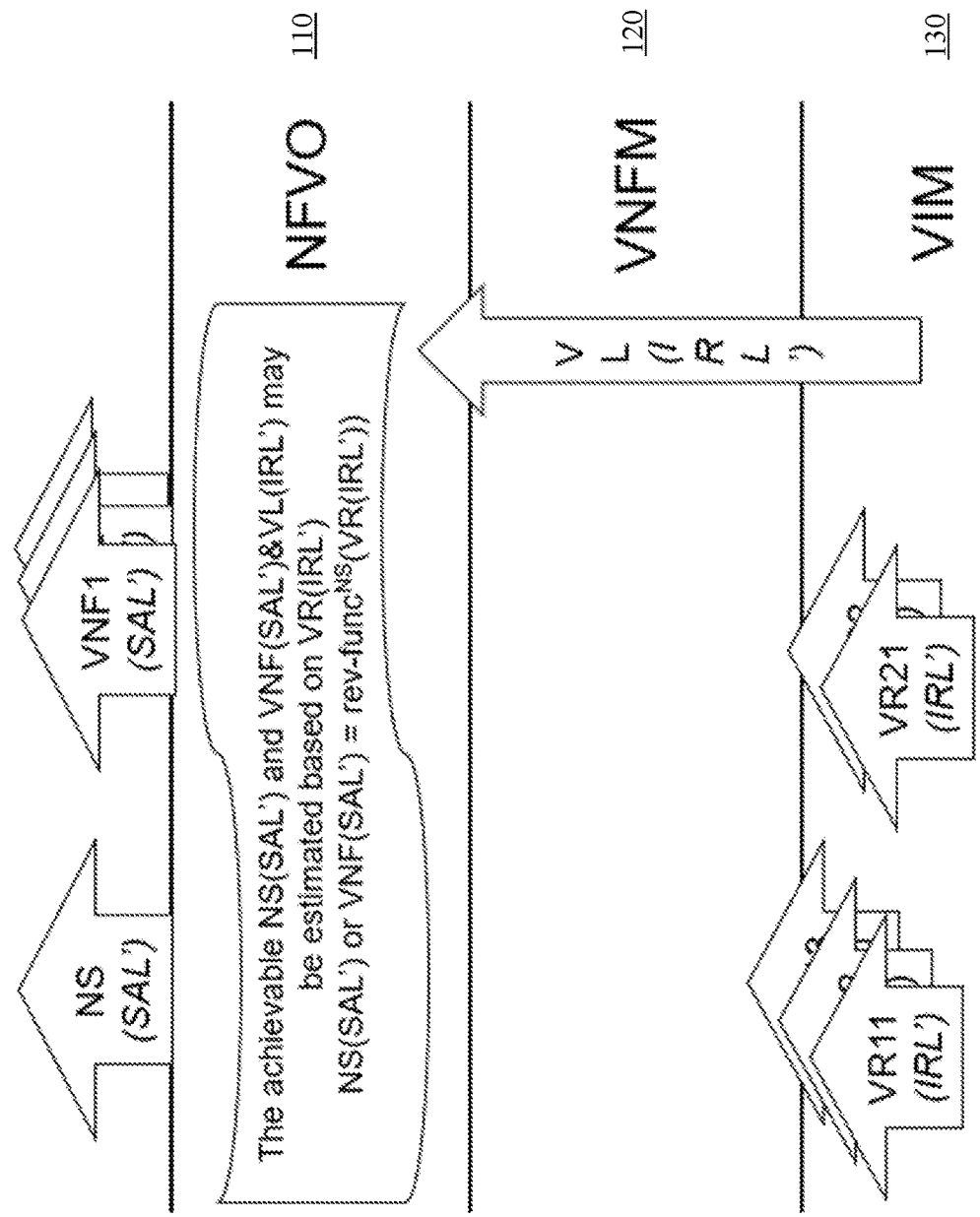

Turning to FIGS. 3 and 4, as stated previously, in the ETSI NFV IFA specifications, it is not defined how the NFVO 110 grants resources of appropriate categories/types so that that the SAL for the NS, NS(SAL), can be met.

It is assumed that the NFVO 110 is aware of some function/policy e.g. func$^{IRL}$, which determines the appropriate resources.

The VNF Manager 120 allocates with the Virtual Infrastructure Manager 130 the resources granted by the NFVO without being aware of the SAL/Infrastructure Reliability Level (IRL) they can provide. The VIM 130 creates the requested resources based on the allocation request and may or may not be aware of the IRL that these resources can provide. Whenever there is a change in the resources, e.g. a VM is migrated to another host, a host fails, etc. the VIM provides notifications for the impacted virtualized resources about the resource change.

There are some issues with the current solution. The NFVO 110 is the only entity aware of SAL and its relation to the resources. This is currently an implied function, not spelled out/required in the specification. The VIM 130 may rearrange resources due to failure and/or priorities without triggering new grant requests towards the NFVO 110. The VIM 130 is not mandated to generate resource change notification for IRL change, but it is for migration, failure, etc. These notifications also do not need to include IRL value, thus the subscriber receiving the notification needs to understand if the resource change has IRL change implications as well. The NFVO 110 needs to subscribe to resources change notifications if it is expected to act in such cases. Without subscription and without understanding IRL implication of changes, no action can be taken if the resources are not appropriate anymore. The NFVO 110 is not supposed to do low level resources management. It typically maintains information about the status of virtualized resources, but not of physical resources hosting these virtualized resources. The NFVO 110 is not aware of VNF internals, that is, the VNF composition of different VNF components (VNFC) and the number of their instances. The NFVO is aware of only NS level actions of life cycle management (LCM), and if a VNFM 120 needs to be requested to carry out related LCM actions. For example, if the IRL change can be compensated by increasing redundancy, the NFVO 110 can scale out the NS by instantiating new VNF instances for which it invokes the related VNFM 120 to carry out the instantiations. But the NFVO is not responsible for scaling out VNFs by instantiating new VNFC instances, which might be a preferred way of compensating for an IRL change. The NFVO is not aware of these VNFCs and their scaling possibilities.

In FIG. 3, starting at the top of the figure, a request for a network service is received by the NFVO 110, which can specify the requested NS(SAL) or the SAL and IRL values respectively for its composing virtual network function VNF(SAL) and virtual links VL(IRL). IRL concerns virtual resources, which may be, for example, virtual compute, virtual storage, virtual network resources. The SAL is for the NS or the VNF instance.

Then, depending on the NS design (e.g. VNFs redundancy) different Virtual Resources (VR) IRL (VR(IRL)) may be needed to achieve the requested SAL, where:

$$VR(IRL)=func^{IRL}(NS(SAL)) \text{ or}$$

$$VR(IRL)=func^{IRL}(VNF(SAL)\&VL(IRL)).$$

A function $func^{IRL}$ is determined by the NS designer or service provider. It determines the infrastructure reliability level of resources VR(IRL) needed to achieve the requested NS(SAL) or the requested VNF(SAL) and VL(IRL) using the given VNF and VL flavors. The NFVO is aware of $func^{IRL}$ and grants resources accordingly.

The VNF1(SAL) and VNF2(SAL) are specified in the NS descriptor (NSD), but they are not provided to the VNFM by the NFVO in the instantiation request that the NFVO sends to the VNFM 120. The VNFM is not aware of the SAL/IRL. The VNFM 120 starts the instantiation of the VNFs by requesting the NFVO to grant resources for the VNFs components. The IRL, determined by the $func^{IRL}$ known to the NFVO 110, is implied through the VRs granted by the NFVO resources, which the VNFM 120 then allocates with the VIM 130.

Virtual resources VR11 to VR13, VR21 and VR22 are then allocated by the VIM 130 based on the allocation request from the VNFM 120, which indicates the VRs granted by the NFVO resources. No IRL value is passed explicitly in the grant response of the NFVO and therefore no TRL is indicated in the allocation request of the VNFM 120 towards the VIM 130. The VIM interprets the VR(IRL) based on the type of the virtual resource requested.

Figure 1:
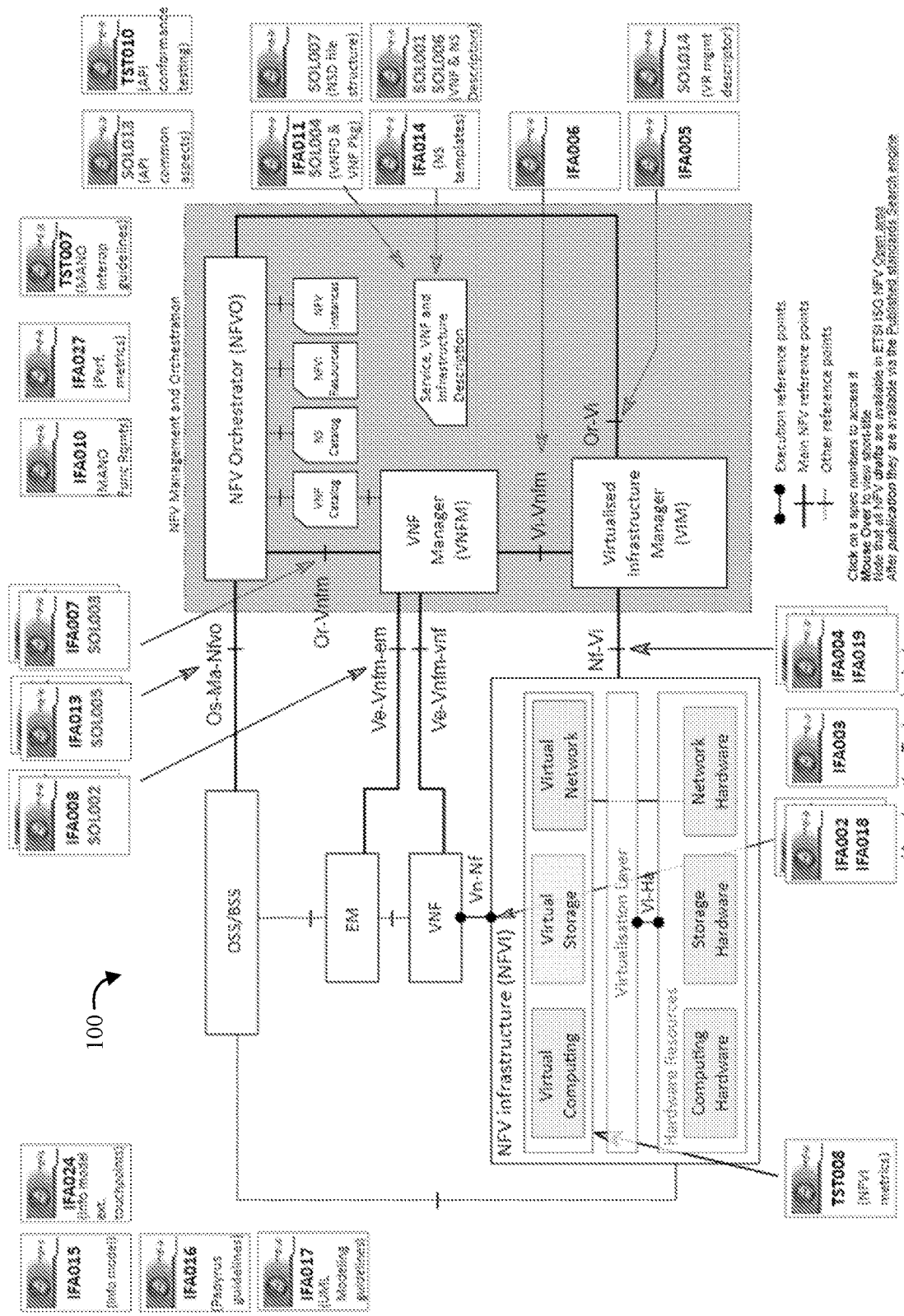
FIG. 1 is a schematic illustration of the NFV architecture framework.
Figure 2:
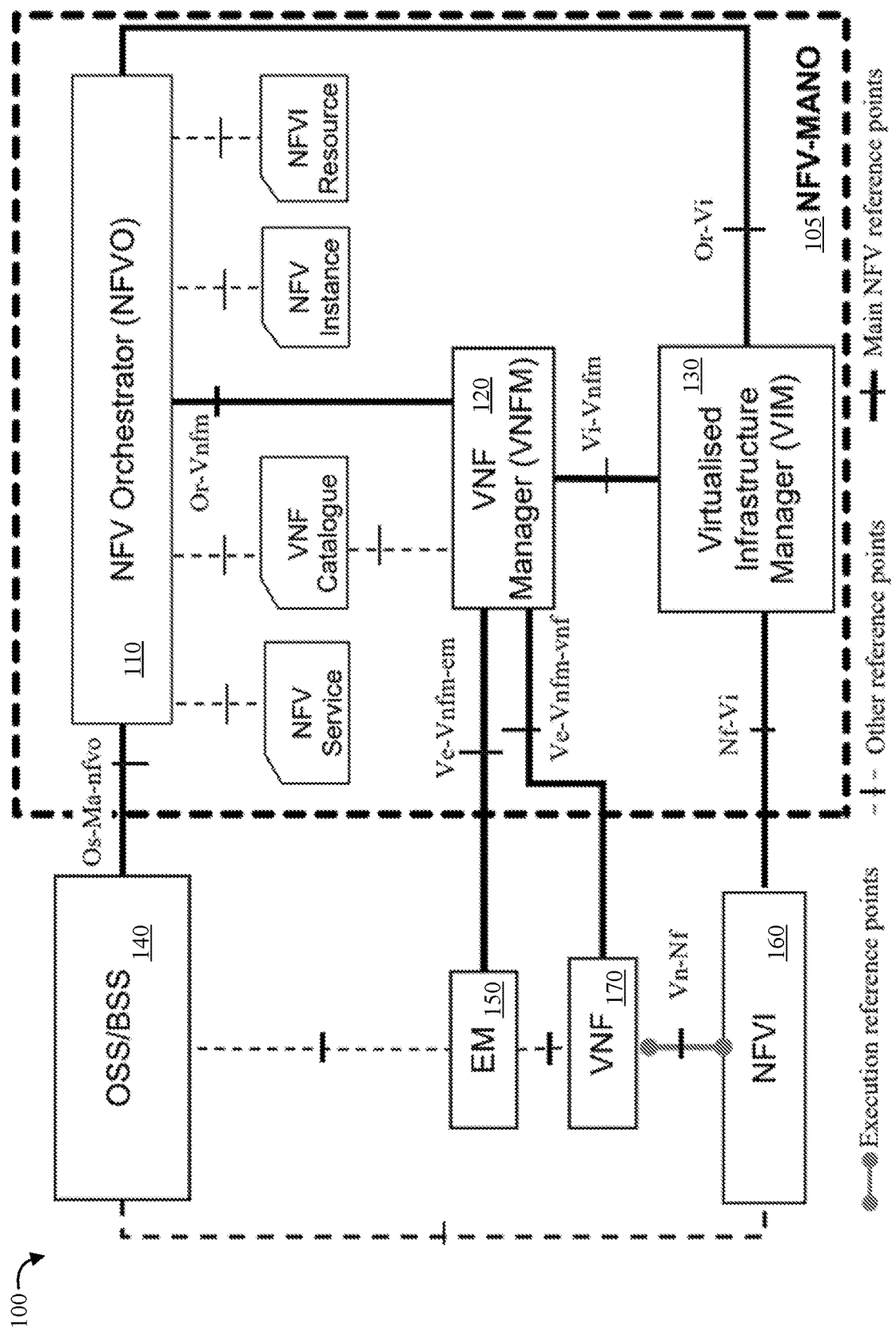
FIG. 2 is a simplified view of FIG. 1, illustrating the NFV-Management and Orchestration (MANO) architectural framework with reference points.

The virtual links (VLs) of the NS are allocated by the NFVO with the VIM directly (via the Or-Vi interface of FIGS. 1 and 2). Again, the VIM 130 interprets the VL(IRL) based on the type of the virtual link requested by the NFVO 110, and no such value is passed in the allocation request.

FIG. 4, starting at the bottom, illustrates a flow for resource change notifications. IRL' is an estimate of the provided IRL for a virtual resource. SAL' is an estimate of the provided SAL. These values are not included in the notifications explicitly. They need to be implied based on other attributes of the notifications.

For each requested VR, the VIM 130 allocates a VR with IRL'. IRL' may or may not be the same as the IRL implied by the NFVO. Initially, IRL=IRL' is expected, but due to VIM 130 internal actions, the IRL' may change, e.g. if a VM is migrated to another host. In such a case, the VIM should generate a resource change notification. The IRL' is not reported by the VIM in these notifications explicitly. The subscriber receiving the notification needs to imply it from the change reported. VR(IRL') are not provided explicitly to the VNFM 120 for each of VR11 to VR13, VR21 and VR22. The VNFM 120 needs to imply it from other information provided in the notification. Similarly, VL(IRL') is implied but not provided to the NFVO 110.

Thus, the VNFM 120 operates on the assumption that the granted resources are always appropriate, and the VIM 130 always provides them as requested. The VNFM 120 does not know the significance of receiving a resource change notification for different IRLs'.

VNFM cannot provide VNF1(SAL') and VNF2(SAL') to the NFVO as it is not aware of requested and estimated SAL and IRL values. The NFVO needs to estimate the VNF1 (SAL') and VNF2(SAL') values based on the resource change notifications the VIM issued assuming the NFVO subscribes to these notifications. In case the NSD specified the requested VNF(SAL) the NFVO may estimate the VNF (SAL') as $$VNF(SAL')=rev-func^{NS}(VR(IRL'))$$

Alternatively, i.e. if NS(SAL) was specified in the NSD, the NFVO may estimate the achievable NS(SAL') based on the VR(IRL') notified by the VIM, where:

$$NS(SAL')=rev-func^{NS}(VR(IRL'))$$

The NFVO 110 needs to be aware of the $rev-func^{NS}$ function which estimates, based on the VR(IRL') the achievable NS(SAL') or VNF(SAL'). It may need to subscribe to the resource change notifications of the VIM 130 to detect if the IRL' is different from the requested IRL and actions that need to be taken, e.g. report to OSS or scale NS. NS(SAL') can be provided to the OSS as the output of the NFVO 110.

In the currently existing solution of FIGS. 3 and 4, only the NFVO 110 is aware of the NS(SAL) or the VNF(SAL) and assigns the resources at the grant operation, i.e. when granting resources. However, there could be VIM level operations which do not trigger new grant operation, and the outcome of these VIM level operations could impact the achievable SAL. As an example, after a failure, the VIM 130 may need to re-arrange the virtualized resources and some of these VRs may not be hosted any more on adequate (physical) resources.

The VIM 130 issues resource change notifications, but these notifications do not contain reliability/availability information. The NFVO 110 needs to subscribe to these notifications and be able to interpret the changes reported by the VIM in terms of IRL changes, i.e. whether IRL'=IRL.

In this respect the VNF level redundancy also plays a role on the achievable SAL. The NFVO 110 is not supposed to be aware of such VNF internals, such as the number of different VNFC instances, that is, their redundancy, which is the VNFM's responsibility. The VNFM 120 is completely ignorant, in the solution illustrated in FIGS. 3 and 4, of resource reliability/availability and their relation to the VNF or NS SAL. All these requires the NFVO to be aware of details it is not supposed to handle today.

Finally, the NS design is done by the service provider while the VNFs are designed by the VNF vendors, so combining them into a function that the NFVO 110 can use may not be straightforward.

To solve the identified problems, it is proposed to propagate the required availability or reliability level across the interfaces between the layers of NFV-MANO functional entities and to provide hooks in the NFV-MANO 105 functional entities. These hooks act as placeholders where functions or policies can be plugged in to tune the behavior of an NFV-MANO entity in terms of decisions and actions it takes. The hooks can map a requested availability or reliability level received at the upper layer boundary to required availability or reliability level towards the lower layer boundary. The hooks can map a provided (estimated) availability or reliability level received at the lower layer boundary to achievable availability or reliability level to compare it with the requested availability or reliability level at the upper layer boundary. The hooks can map, whenever the achievable availability or reliability level estimated does not satisfy the requested one, into actions to help to achieve the requested level.

Both mapping a requested availability or reliability level received at the upper layer boundary to required availability or reliability level towards the lower layer boundary and mapping a provided (estimated) availability or reliability level received at the lower layer boundary to achievable availability or reliability level to compare it with the requested availability or reliability level at the upper layer boundary can be repeated until the requested level is achieved, otherwise the achievable level is reported to the upper layer, where the similar procedure. e.g. mapping, could apply.

At the hooks, policies or functions can be included as appropriate at the given level in both directions. These might be based on formula, classification, or analytics. The analytics could be based on analytical models, on models learnt in advance or over time using machine learning and/or other artificial intelligence techniques.

When a request is propagated downward (towards the VIM 130) and the function/policy is not provided for the NFV-MANO functional entity of the given layer by default, the same value as requested is propagated downward to all lower layer NFV-MANO functional entities.

When an estimate is propagated upward and the function/policy is not provided for the NFV-MANO functional entity of the receiving layer, by default the minimum of all received estimate values is propagated upward to the next layer.

Figure 5:
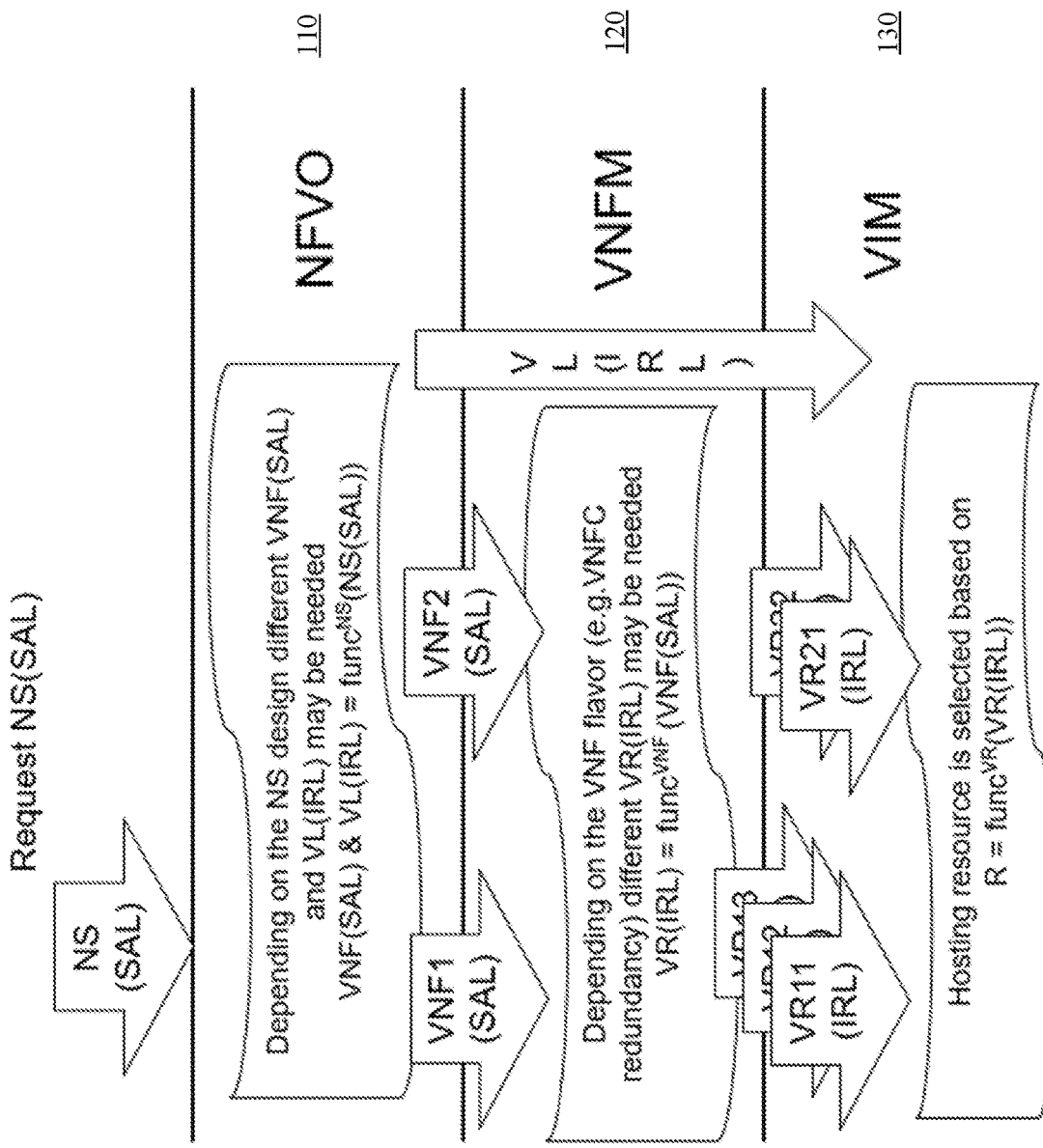
FIGS. 5 and 6 are schematic illustrations of a new Service Availability Level proposed for inclusion in the ETSI NFV IFA specifications.
Figure 6:
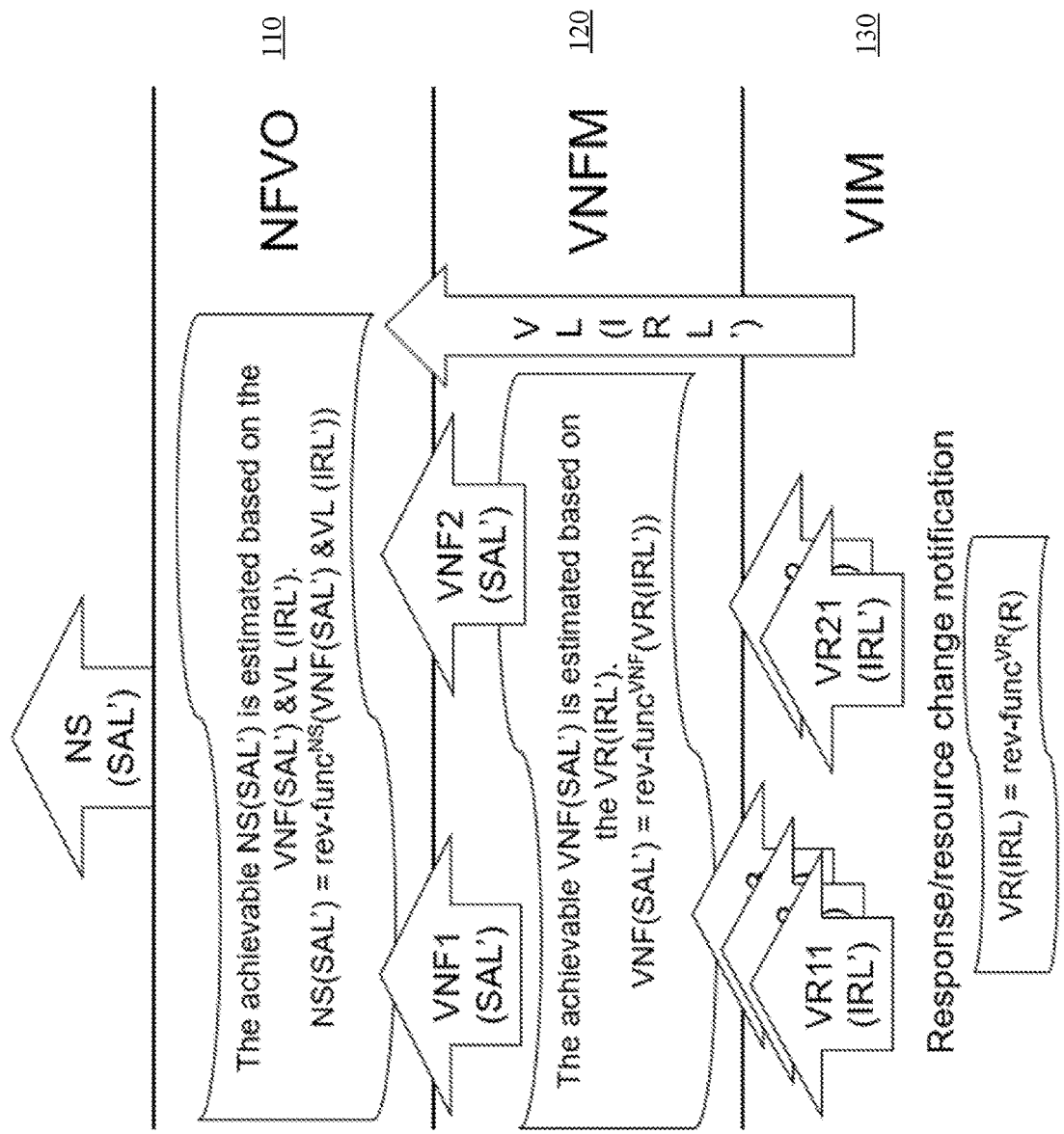

Turning to FIGS. 5 and 6, a new method for providing SAL is illustrated. It is proposed to make NFV-MANO 105 entities "availability aware" by passing the requested/provided SAL/IRL values on the interfaces explicitly. It is proposed to provide the NFV-MANO entities with hooks for functions & policies to evaluate the situation and act. Herein, hooks act as placeholders where functions or policies can be plugged in to tune the behavior of an NFV-MANO entity in terms of decisions and actions it takes. It is proposed to, on the request path, provide hooks to plug-in functions/policies to calculate for a requested availability objective the needed availability/reliability level of the different constituents and request them from the supporting layer(s) based on configuration of those constituents. On the response/notification path, provide hooks to plug-in functions/policies to estimate if the availability objective can be met with the constituents provided by the supporting layer(s) based on their availability/reliability levels and one the configuration of those constituents; and provide hooks to plug-in policies/actions to apply if there is a mismatch between the availability objective and the estimate.

The SAL/TRL may be expressed in terms of 9's, percentage, or as enum values associated with ranges expressed as 9's. Mapping between the two may be necessary, e.g., VNF vendor gives 9's, SP uses enum of small integers.

For the request path, $func^{NS}$, $func^{VNF}$ and $func^{VR}$ may be provided in terms of 9s', which may need to be mapped to the levels (enums) defined by a given operator/service provider. The functions $func^{NS}$, $func^{VNF}$ and $func^{VR}$ could be based on calculation, analytics, policies etc.

For the NFVO, the equation VNF(SAL) & VL(IRL)=$func^{NS}$(NS(SAL)) is defined by the NS designer/service provider. The function $func^{NS}$ can be based on analytical models or models constructed using machine learning or other techniques of artificial intelligence. The NFVO 110 determines, for each VNF and VL in the NS flavor, the VNF(SAL) and VL(TRL) needed to achieve the requested NS(SAL), i.e. the availability objective. If $func^{NS}$ is not provided, the default behavior is VNF(SAL)=VL(IRL)=NS(SAL). If NS(SAL) is not requested, it may be assumed to be best effort, or any default specified for the system.

Based on the calculated values, the NFVO 110 requests the VNF(SAL) from the VNFM 120 when it requests the instantiation of the VNF. The NFVO 110 passes the calculated VL(IRL) to the VIM 130 in the instantiation request of the VL.

For the VNFM 120, VR(IRL)=$func^{VNF}$(VNF(SAL)) is provided by the VNF vendor. The function $func^{VNF}$ can be based on policies, on predefined analytical models, or on models constructed by machine learning or other techniques of artificial intelligence capable of runtime refinement. The $func^{VNF}$ determines for the VNF or one of its flavors the different VR(IRL) needed to achieve the requested VNF (SAL). This function may be provided per VNF/VNFC/VL of the VNF or a VNF flavor. If $func^{VNF}$ is not provided, the default behavior is VR(IRL)=VNF(SAL). The VNFM 120 uses this function to calculate the VR(IRL) for the virtualized resources it needs to request from the NFVO (to be granted by the NFVO) to allocate with the VIM 130. When the virtualized resources are granted by the NFVO 110, the VNFM 120 allocates them with the VIM 130. If the granted virtualized resources do not satisfy the request, the VNFM 120 may have different options, for example, fail the instantiation or act according to policies specified in the response path as if the VIM 130 reported VR(IRL') were different from those requested. If the NFVO 110 does not handle or indicate the VR(TRL), it is assumed that the VR(IRL) of granted resources are matching the VR(IRL) of the request.

The VIM 130, has a R=$func^{VR}$(IRL) or policy provided by the operator to select the resource R that need to host the VR to meet the VR(IRL). The function $func^{VR}$ can be based on predefined analytical models, or on models constructed by machine learning or other techniques of artificial intelligence capable of runtime refinement. If a function/policy is not provided or a VR(IRL) is not requested, then best effort is assumed.

For the response/notification path, rev-$func^{NS}$, rev-$func^{VNF}$ and rev-$func^{VR}$ may be provided in terms of 9s', which may need to be mapped to the levels (enums) defined by a given operator/service provider. E.g., a vendor not knowing an operator's resources may say that if the provided VMs have 99.95% IRL and VLs have 99.99%, the VNF flavour can guarantee 99.995% SAL according to $func^{VNF}$ and rev-$func^{VNF}$.

An operator may say that it classifies the resources as gold 99.99% and above IRL, silver as 99.91-99.98% IRL, and bronze below 99.98%. At the NS level there may be different enums for SAL, e.g. ultra-reliable (>99.9999%), enterprise (>99.999%), and best effort (<99.999%). Then the operator's VIM will use gold, silver and bronze, while the VNFM has functions according to percentages. These different SAL/IRL metrics are mapped into one another at each layer.

For the NFVO, the equation NS(SAL')=rev-$func^{NS}$(VNF (SAL') & VL(IRL')) is defined by the NS designer/service provider. Using this function, the NFVO estimates the availability for the NS flavor based on the VNF(SAL') reported by the VNFM and VL(IRL') provided by VIM. The function rev-$func^{NS}$ can be based on predefined analytical models, or on models constructed by machine learning or other techniques of artificial intelligence. If rev-$func^{NS}$ is not provided, the default behavior is NS(SAL')=min(VNF (SAL'), VL(IRL')). If a VNF(SAL') or VL(IRL') is not received, it is assumed to be best effort.

For the VNFM 120, VNF(SAL')=rev-$func^{VNF}$(VR(IRL')) is provided by the VNF vendor. The rev-$func^{VNF}$ estimates the VNF(SAL') for the VNF flavor given the VR(IRL') provided by (or received from) the VIM for the resources. The function rev-$func^{VNF}$ can be based on predefined analytical models, or on models constructed by machine learning or other techniques of artificial intelligence capable of runtime refinement. If rev-func$^{VNF}$ is not provided, the default behavior is VNF(SAL')=min(VR(IRL')). If VR(IRL') is not received from the VIM 130, it is assumed to be best effort.

The VIM 130 reports the VR(IRL') based on the VR(IRL')=rev-func$^{VR}$(R) function of the hosting resources (e.g. their IRL, or classification) as defined by the operator. The function rev-func$^{VR}$ can be based on predefined analytical models, or on models constructed by machine learning or other techniques of artificial intelligence capable of runtime refinement. By default, it is assumed to be best effort.

In case of discrepancy between the SAL or IRL requested and the SAL' or IRL' received at any of the layers, possible actions include: report/notify the provided estimate to the upper layer (default); and request other resources (e.g. move VM to different host), scale out so that the estimate meets the goal. In the latter cases, the estimate is reported if necessary, after the compensating actions are performed and the estimate is reevaluated.

In FIG. 5, starting at the top of the figure, a request for a network service NS(SAL) is received by the NFVO 110. In this flow, SAL/IRL values are passed to the supporting managers.

Then, depending on the NS design, different VNF(SAL) and VL(TRL) may be needed, where:

$$VNF(SAL)\ \&\ VL(IRL)=func^{NS}(NS(SAL)).$$

A function func$^{NS}$ is defined by the NS designer or service provider. It determines the VNF(SAL) & VR(IRL) needed to achieve the requested NS(SAL) using the given VNF/VL flavors. The function is pluggable and has default behavior and values as described earlier.

Based on the above calculation the VNF1(SAL) and VNF2(SAL) are provided to the VNFM 120 by the NFVO 110. Depending on the VNF flavor (e.g. VNFC redundancy) different VR(IRL) may be needed, where:

$$VR(IRL)=func^{VNF}(VNF(SAL)).$$

The function func$^{VNF}$ is provided by the VNF vendor, for example, for each VNF flavor considering each VNFC. The function determines the infrastructure reliability level needed for the different VRs to achieve the requested VNF(SAL) using the given VNF flavor. The function is pluggable and has default behavior values as described earlier. Based on these the VNFM 120 requests from the VIM 130 the needed resources—provided they were granted by the NFVO 110.

The NFVO 110, based on its calculations, also request the VIM 130 to allocate the VL with VL(IRL) as calculated by the func$^{NS}$.

The VIM 130 selects resources to allocate the VRs ensuring that the VR(TRL) received from the NFVO 110 and the VNFM 120 are met based on func$^{VR}$, for example, or the classification of each resource. Virtual resources VR11 to VR13, VR21 and VR22 are allocated by the VIM 130. The function is pluggable and has default values.

FIG. 6, starting at the bottom, illustrates a flow for responses to allocation requests and resource change notifications.

The VIM 130 allocates VRs on resources so that VR(IRL) is met based on rev-func$^{VR}$ function/classification. VIM 130 reports back the VR(IRL') in the response at allocation, and at any resource change in a notification. Function/classification is pluggable otherwise the VIM 130 reports default values. The VR11(IRL') to VR13(IRL'), VR21(IRL') and VR22(IRL') are provided to the VNFM.

For the VL allocated by the NFVO 110 directly, the VIM 130 reports back the VL(IRL') directly to the NFVO 110 in a similar manner.

The VNFM estimates the achievable VNF(SAL') based on the VR(IRL') provided by the VIM, using:

$$VNF(SAL')=rev\text{-}func^{VNF}(VR(IRL')).$$

The function rev-func$^{VNF}$ is provided by the VNF vendor. It determines for the given VNF flavor the achievable VNF(SAL') based on the VR(IRL') provided. If the estimate does not meet the requested VNF(SAL) the VNFM takes actions, for example, as based on policies, e.g. scale out, after which it reevaluates the achievable VNF(SAL'). By default, the VNFM 120 reports the estimated VNF(SAL') to the NFVO by providing e.g. VNF1(SAL') and VNF2(SAL').

At the NFVO 110, the achievable NS(SAL') is estimated based on the VNF(SAL') & VL(IRL'), where:

$$NS(SAL')=rev\text{-}func^{NS}(VNF(SAL')\ \&\ VL(IRL')).$$

The function rev-func$^{NS}$ is defined by the NS designer/service provider. It determines, for the given NS flavor, the achievable NS(SAL') based on the received VNF(SAL') and VL(IRL'). If the estimate does not meet the requested NS(SAL), the NFVO takes actions, for example, based on policies, e.g. scale out. By default, the NFVO reports the estimated NS(SAL') to the OSS 140.

FIG. 7 illustrates a method, 700, executed by a Network Function Virtualisation (NFV)-Management and Orchestration (MANO) for providing a requested Service Availability Level (SAL) for a Network Service (NS), comprising:
  propagating, step 701, the requested SAL through interfaces between layers of the NFV-MANO, from the NFV Orchestrator (NFVO) to the Virtualised Infrastructure Manager (VIM); and
  the VIM allocating, step 707, virtual resources for the NS that satisfy the requested SAL.

The method wherein propagating the requested SAL may further comprise mapping, step 702, the requested SAL received from an upper layer to a SAL that need to be provided by a lower layer.

The method wherein propagating the requested SAL may further comprise propagating, step 703, a requested Infrastructure Reliability Level (IRL).

The method wherein propagating the requested SAL may further comprise mapping, step 704, the requested IRL received from an upper layer to an IRL that need to be provided by a lower layer.

The method may further comprise the NFVO determining, step 705, SAL and IRL needed for Virtual Network Functions (VNFs) and Virtual Links (VLs) constituting the NS, respectively VNF(SAL) and VL(IRL), to achieve the requested SAL for the NS, and providing the VNF(SAL) to the VNF manager (VNFM) and the VL(IRL) to the VIM.

The method wherein the NFVO determines the VNF (SAL) and VL(IRL) using VNF(SAL) and VL(IRL)=func$^{NS}$(NS(SAL)), wherein func$^{NS}$ is a function or policy defined through scripts provided with the NS package or is by default equal to NS(SAL).

The method may further comprise the VNFM determining, step 706, IRL for VRs, VR(IRL), allocated to execute the VNFs, to achieve the requested SAL for the NS, and providing the VR(IRL) to the VIM.

The method wherein the VNFM determines the VR(IRL) using VR(IRL)=func$^{VNF}$(VNF(SAL)), and wherein func$^{VNF}$ is a function or policy defined through scripts provided with the VNF or is by default equal to NS(SAL).

The method may further comprise, after the step of allocating, propagating, step 708, estimated SAL (SAL') from a lower layer towards an upper layer of the NFV-MANO and comparing the estimated SAL' with the requested SAL.

The method may further comprise, upon determining, step 712, that the estimated SAL' does not satisfy the requested SAL, taking actions to meet the requested SAL.

The method wherein taking actions comprises any one or more of:
- a scale out by the NFV Orchestrator (NFVO);
- the NFVO reporting that the estimated SAL' does not satisfy the requested SAL to the Operations Support Systems (OSS);
- a scale out by the VNF manager (VNFM);
- the VNFM reporting that the estimated SAL' does not satisfy the requested SAL to the element manager or to other subscribing manager(s) to take further actions;
- the VNFM reporting that the estimated SAL' does not satisfy the requested SAL to the NFVO;
- a request for other resources from the VIM;
- a change of resources configuration by the VIM;
- a rearrangement of virtual resources by the VIM; and
- a move of Virtual Machines (VMs) to different hosts by the VIM.

The method wherein the steps of propagating the estimated SAL' and comparing the estimated SAL' with the requested SAL are executed iteratively.

The method wherein propagating the estimated SAL' further comprises the VIM providing, step 709, estimated Virtual Resource Infrastructure Reliability Level, VR(IRL'), to the VNFM and Virtual Link (VL) IRL, VL(IRL'), to the NFVO.

The method wherein propagating the estimated SAL' further comprises the VNFM estimating, step 710, SAL of the VNF, VNF(SAL'), based on the provided VR(IRL').

The method wherein the VNFM estimates VNF(SAL') using VNF(SAL')=rev-func$^{VNF}$ (VR(IRL')), and wherein rev-func$^{VNF}$ is a reverse function or policy defined in the VNF descriptor.

The method wherein propagating the estimated SAL' further comprises the VNFM providing, step 710, estimated VNF(SAL') to the NFVO.

The method wherein propagating the estimated SAL' further comprises the NFVO estimating, step 711, SAL of the NS, the NS(SAL'), based on the VNF(SAL') provided by the VNFM and on the VL(IRL') provided by the VIM.

The method wherein the NFVO estimates NS(SAL') using NS(SAL')=rev-func$^{NS}$(VNF(SAL') & VL(IRL')), and wherein rev-func$^{NS}$ is a reverse function or policy defined in the NS descriptor.

The proposed solution allows for each manager to handle the availability part for the objects they are managing and are aware of. Different solutions can be applied at different layers and for different constituents, e.g. the VIM may use resource classification and policies based on the resource classifications, the VNFM may use heuristics for one VNF, while it can use analytics for another, i.e. whatever is the plugged-in function.

For each layer, it is possible to address problems within the layer, when availability may not be met. Alternatively, problems may be addressed with a solution that is distributed across layers i.e. the VIM may use better host, but if this is not enough the VNFM may increase redundancy by scaling out.

Figure 8:
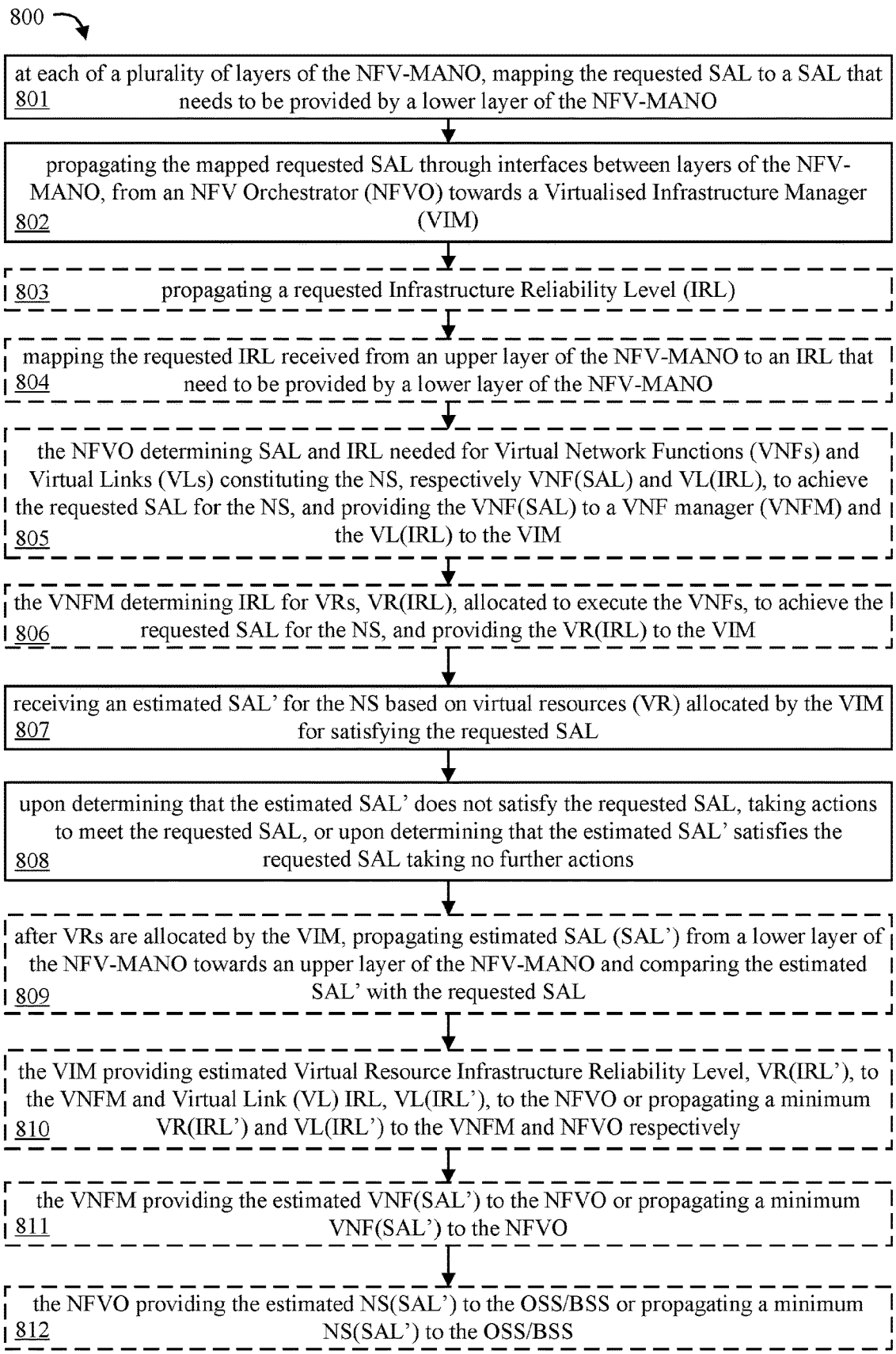
FIG. 8 is a flowchart of a method for achieving requested service availability.

FIG. 8 illustrates a method, 800, executed by a Network Function Virtualisation (NFV)-Management and Orchestration (MANO), for providing a requested Service Availability Level (SAL) for a Network Service (NS). The method comprises at each of a plurality of layers of the NFV-MANO, mapping, step 801, the requested SAL to a SAL that needs to be provided by a lower layer of the NFV-MANO. The word mapping is used in the sense of converting or translating and can also be understood as being a decomposition to the SAL expected from the composing elements. The method comprises propagating, step 802, the mapped requested SAL through interfaces between layers of the NFV-MANO, from an NFV Orchestrator (NFVO) towards a Virtualised Infrastructure Manager (VIM). The method comprises receiving, step 807, an estimated SAL' for the NS based on virtual resources (VR) allocated by the VIM for satisfying the requested SAL. The method comprises upon determining, step 808, that the estimated SAL' does not satisfy the requested SAL, taking actions to meet the requested SAL, or upon determining that the estimated SAL' satisfies the requested SAL taking no further actions.

Propagating the requested SAL may further comprise propagating, step 803, a requested Infrastructure Reliability Level (IRL). Alternatively, propagating the requested SAL may further comprise mapping, step 804, the requested IRL received from an upper layer of the NFV-MANO to an IRL that need to be provided by a lower layer of the NFV-MANO.

The method may further comprise the NFVO determining, step 805, SAL and IRL needed for Virtual Network Functions (VNFs) and Virtual Links (VLs) constituting the NS, respectively VNF(SAL) and VL(IRL), to achieve the requested SAL for the NS, and providing the VNF(SAL) to a VNF manager (VNFM) and the VL(IRL) to the VIM. The NFVO may determine the VNF(SAL) and VL(IRL) using VNF(SAL) and VL(IRL)=func$^{NS}$(NS(SAL)), and func$^{NS}$ may be a function or policy defined through scripts provided with an NS package or the requested SAL is propagated downward to functional entities at lower layers of the NFV-MANO.

The method may further comprise the VNFM determining, step 806, IRL for VRs, VR(IRL), allocated to execute the VNFs, to achieve the requested SAL for the NS, and providing the VR(IRL) to the VIM. The VNFM may determine the VR(IRL) using VR(IRL)=func$^{VNF}$(VNF(SAL)), and func$^{VNF}$ may be a function or policy defined through scripts provided with the VNF or the requested SAL is propagated downward to functional entities at lower layers of the NFV-MANO.

The method may further comprise, after VRs are allocated by the VIM, propagating, step 809, estimated SAL (SAL') from a lower layer of the NFV-MANO towards an upper layer of the NFV-MANO and comparing the estimated SAL' with the requested SAL.

In the method, taking actions may comprises any one or more of:
- a scale out by the NFV Orchestrator (NFVO);
- the NFVO reporting that the estimated SAL' does not satisfy the requested SAL to an Operations Support Systems (OSS);
- a scale out by the VNF manager (VNFM);
- the VNFM reporting that the estimated SAL' does not satisfy the requested SAL to an element manager or to one or more other subscribing manager to take further actions;
- the VNFM reporting that the estimated SAL' does not satisfy the requested SAL to the NFVO;

a request for other resources from the VIM;
a change of resources configuration by the VIM;
a rearrangement of virtual resources by the VIM; and
a move of Virtual Machines (VMs) to different hosts by the VIM.

The steps of propagating the estimated SAL' and comparing the estimated SAL', at each of the layers of the NFV-MANO, with the requested SAL may be executed iteratively.

As a general rule, the iteration is done after taking some actions. For example, if the VNFM requested 10 VMs with IRL=x from the VIM, and the VIM allocates 5 VMs with IRL=x and 5 VMs with IRL=y, where y is less reliable than x, then the VNFM estimates whether with these VMs it can meet the SAL that was requested for the VNF. If not, then it may decide to add an 11th VM (scale out). So, the VNFM asks the VIM for this additional VM with IRL=x, but receives a VM with IRL=y again. The VNFM estimates again if it can satisfy the SAL. If yes, then it reports this estimated SAL' to the NFVO. If not, it may scale out more, or it may decide to leave it as such and report to the NFVO the SAL', which does not satisfy the requested SAL.

The NFVO then will estimate the NS SAL' based on the SAL' received from the VNFM. If this SAL' satisfies the requested NS SAL then it reports back success. If not, then it may scale the NS, i.e. instantiate more VNFs and estimate again. Therefore, at each layer there is an estimation based on the received SAL'/IRL'. The estimates at layer 1 SAL1'/IRL1' are used at layer 2 to estimate what would be the SAL2' that this layer 2 can provide, and it is compared it with the requested SAL2. If SAL2'<SAL2 then layer 2 takes some actions and make a new estimate of SAL2'. If no more actions can be taken, then layer 2 reports SAL2' and it is up to layer 3 to decide what to do. Of course, layer 3 will make an estimate with all the SAL2' estimates it receives of what will be the SAL3' estimate, and so on. "Iteratively", in this context, means an iteration within each layer, where each layer applies the same process.

Propagating the estimated SAL' may further comprise the VIM providing, step 810, estimated Virtual Resource Infrastructure Reliability Level, VR(IRL'), to the VNFM and Virtual Link (VL) IRL, VL(IRL'), to the NFVO or propagating a minimum VR(IRL') and VL(IRL') to the VNFM and NFVO respectively. In the latter case there is no available function to do the estimation and it is the minimum IRL among all the resources the VR or the VL use that is provided, e.g. if a VL uses two physical links and a switch.

Propagating the estimated SAL' may further comprise the VNFM estimating SAL of the VNF, VNF(SAL'), based on the provided VR(IRL').

The VNFM may estimate VNF(SAL') using VNF(SAL')=rev-func$^{VNF}$(VR(IRL')), and rev-func$^{VNF}$ may be a reverse function or policy defined in a VNF descriptor.

Propagating the estimated SAL' may further comprise the VNFM providing, step 811, the estimated VNF(SAL') to the NFVO or propagating a minimum VNF(SAL') to the NFVO. The VNF(SAL') is a minimum of the received VR(IRL') given by the VIM for the VRs that the VNF is using, e.g. if the VNF has 10 VMs, 5 of which have IRL=x and the other 5 which have IRL=y, VNF(SAL=y) is sent to the NFVO when y<x.

Propagating the estimated SAL' may further comprise the NFVO estimating SAL of the NS, NS(SAL'), based on the VNF(SAL') provided by the VNFM and on the VL(IRL') provided by the VIM.

The NFVO may estimate NS(SAL') using NS(SAL')=rev-func$^{NS}$(VNF(SAL') & VL(IRL')), and rev-func$^{NS}$ may be a reverse function or policy defined in the NS descriptor.

Propagating the estimated SAL' may further comprise the NFVO providing, step 812, the estimated NS(SAL') to the Operations Support System (OSS)/Business Support System (BSS) or propagating a minimum NS(SAL') to the OSS/BSS.

Mapping may be based on policies or functions, and the functions may be based on formula, classification, or analytics.

The analytics may be analytical models, models learnt in advance or over time using machine learning, or may be based on other artificial intelligence techniques.

Referring again to FIGS. 1 and 2, there is provided a virtualization environment in which functions and steps described herein can be implemented.

A virtualization environment (which may go beyond what is illustrated in FIGS. 1 and 2), may comprise systems, networks, servers, nodes, devices, etc., that are in communication with each other either through wire or wirelessly. Some or all of the functions and steps described herein may be implemented as one or more virtual components (e.g., via one or more applications, components, functions, virtual machines or containers, etc.) executing on one or more physical apparatus in one or more networks, systems, environment, etc.

A virtualization environment provides hardware comprising processing circuitry and memory. The memory can contain instructions executable by the processing circuitry whereby functions and steps described herein may be executed to provide any of the relevant features and benefits disclosed herein.

FIG. 2 illustrates a system 100 running a Network Function Virtualisation (NFV)-Management and Orchestration (MANO) 105, for providing a requested Service Availability Level (SAL) for a Network Service (NS). The system, comprises processing circuits and a memory, the memory containing instructions executable by the processing circuits whereby the system is operative to: at each of a plurality of layers of the NFV-MANO, map the requested SAL to a SAL that needs to be provided by a lower layer of the NFV-MANO; propagate the mapped requested SAL through interfaces between layers of the NFV-MANO, from an NFV Orchestrator (NFVO) towards a Virtualised Infrastructure Manager (VIM); receive an estimated SAL' for the NS based on virtual resources (VR) allocated by the VIM for satisfying the requested SAL; and upon determining that the estimated SAL' does not satisfy the requested SAL, take actions to meet the requested SAL, or upon determining that the estimated SAL' satisfies the requested SAL taking no further actions.

The system 100 is further operative to execute any of the steps of the methods described herein.

The hardware may also include non-transitory, persistent, machine readable storage media having stored thereon software and/or instruction executable by processing circuitry to execute functions and steps described herein.

The virtualisation environment, comprising systems, networks, servers or nodes is operative to provide or execute a Network Function Virtualisation (NFV)-Management and Orchestration (MANO) for providing a requested Service Availability Level (SAL) for a Network Service (NS). The systems, networks, servers or nodes comprise processing circuits and memory, the memory containing instructions executable by the processing circuits whereby the systems, networks, servers or nodes are (individually or collectively) operative to execute any of the steps provided herein.

A non-transitory computer readable media has stored thereon instructions for executing by a Network Function Virtualisation (NFV)-Management and Orchestration (MANO) for providing a requested Service Availability Level (SAL) for a Network Service (NS). The instructions comprise instructions for executing any of the steps described herein.

A non-transitory computer readable media (not illustrated) has stored thereon instructions for providing a requested Service Availability Level (SAL) for a Network Service (NS) through a Network Function Virtualisation (NFV)-Management and Orchestration (MANO). The instructions comprise at each of a plurality of layers of the NFV-MANO, mapping the requested SAL to a SAL that needs to be provided by a lower layer of the NFV-MANO; propagating the mapped requested SAL through interfaces between layers of the NFV-MANO, from an NFV Orchestrator (NFVO) towards a Virtualised Infrastructure Manager (VIM); receiving an estimated SAL' for the NS based on virtual resources (VR) allocated by the VIM for satisfying the requested SAL; and upon determining that the estimated SAL' does not satisfy the requested SAL, taking actions to meet the requested SAL, or upon determining that the estimated SAL' satisfies the requested SAL taking no further actions.

The non-transitory computer readable media may further comprise instructions to execute any of the steps of the methods described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method, executed by a Network Function Virtualisation (NFV)-Management and Orchestration (MANO), for providing a requested Service Availability Level (SAL) for a Network Service (NS), comprising:
at each of a plurality of layers of the NFV-MANO, mapping the requested SAL to a SAL that needs to be provided by a lower layer of the NFV-MANO;
propagating the mapped requested SAL through interfaces between layers of the NFV-MANO, from an NFV Orchestrator (NFVO) towards a Virtualised Infrastructure Manager (VIM);
receiving an estimated SAL' for the NS based on virtual resources (VR) allocated by the VIM for satisfying the requested SAL;
propagating the estimated SAL (SAL') from a lower layer of the NFV-MANO towards an upper layer of the NFV-MANO and comparing the estimated SAL' with the requested SAL; and
upon determining that the estimated SAL' does not satisfy the requested SAL, taking actions to meet the requested SAL, or upon determining that the estimated SAL' satisfies the requested SAL taking no further actions;
wherein propagating the estimated SAL' further comprises the VIM providing estimated Virtual Resource Infrastructure Reliability Level, VR(IRL'), to a VNF manager (VNFM) and Virtual Link (VL) IRL, VL(IRL'), to the NFVO or propagating a minimum VR(IRL') and VL(IRL') to the VNFM and NFVO respectively.

2. The method of claim 1, wherein propagating the requested SAL further comprises propagating a requested Infrastructure Reliability Level (IRL).

3. The method of claim 2, wherein propagating the requested SAL further comprises mapping the requested IRL received from an upper layer of the NFV-MANO to an IRL that need to be provided by a lower layer of the NFV-MANO.

4. The method of claim 1, further comprising the NFVO determining SAL and IRL needed for Virtual Network Functions (VNFs) and Virtual Links (VLs) constituting the NS, respectively VNF(SAL) and VL(IRL), to achieve the requested SAL for the NS, and providing the VNF(SAL) to a VNF manager (VNFM) and the VL(IRL) to the VIM.

5. The method of claim 4, wherein the NFVO determines the VNF(SAL) and VL(IRL) using VNF(SAL)=VL(IRL)=func$^{NS}$(NS(SAL)), and wherein func$^{NS}$ is a function, or policy, defined through scripts provided with an NS package, or the requested SAL is propagated downward to functional entities at lower layers of the NFV-MANO.

6. The method of claim 1, further comprising a VNF manager (VNFM) determining IRL for VRs, VR(IRL), allocated to execute Virtual Network Functions (VNFs), to achieve the requested SAL for the NS, and providing the VR(IRL) to the VIM.

7. The method of claim 6, wherein the VNFM determines the VR(IRL) using VR(IRL)=func$^{VNF}$(VNF(SAL)), and wherein func$^{VNF}$ is a function, or policy, defined through scripts provided with a VNF, or the requested SAL is propagated downward to functional entities at lower layers of the NFV-MANO.

8. The method of claim 1, wherein taking actions comprises any one or more of:
a scale out by the NFV Orchestrator (NFVO);
the NFVO reporting that the estimated SAL' does not satisfy the requested SAL to an Operations Support Systems (OSS);
a scale out by a VNF manager (VNFM);
the VNFM reporting that the estimated SAL' does not satisfy the requested SAL to an element manager or to one or more other subscribing manager to take further actions;
the VNFM reporting that the estimated SAL' does not satisfy the requested SAL to the NFVO;
a request for other resources from the VIM;
a change of resources configuration by the VIM;
a rearrangement of virtual resources by the VIM; and
a move of Virtual Machines (VMs) to different hosts by the VIM.

9. The method of claim 1, wherein the steps of propagating the estimated SAL' and comparing the estimated SAL', at each of the layers of the NFV-MANO, with the requested SAL are executed iteratively.

10. The method of claim 1, wherein propagating the estimated SAL' further comprises the VNFM estimating SAL of the VNF, VNF(SAL'), based on the provided VR(IRL').

11. The method of claim 10, wherein the VNFM estimates VNF(SAL') using VNF(SAL')=rev-func$^{VNF}$(VR(IRL')), and wherein rev-func$^{VNF}$ is a reverse function or policy defined in a VNF descriptor.

12. The method of claim 10, wherein propagating the estimated SAL' further comprises the VNFM providing the estimated VNF(SAL') to the NFVO or propagating a minimum VNF(SAL') to the NFVO.

13. The method of claim 1, wherein mapping is based on policies or functions, and wherein the functions are based on formula, classification, or analytics.

14. The method of claim 13, wherein the analytics are analytical models, models learnt in advance or over time using machine learning, or are based on other artificial intelligence techniques.

15. A system running a Network Function Virtualisation (NFV)-Management and Orchestration (MANO), for providing a requested Service Availability Level (SAL) for a Network Service (NS), comprising processing circuits and a memory, the memory containing instructions executable by the processing circuits whereby the system is operative to execute the method of claim 1.

16. A non-transitory computer readable media having stored thereon instructions for providing a requested Service Availability Level (SAL) for a Network Service (NS) through a Network Function Virtualisation (NFV)-Management and Orchestration (MANO), the instructions comprising:
   at each of a plurality of layers of the NFV-MANO, mapping the requested SAL to a SAL that needs to be provided by a lower layer of the NFV-MANO;
   propagating the mapped requested SAL through interfaces between layers of the NFV-MANO, from an NFV Orchestrator (NFVO) towards a Virtualised Infrastructure Manager (VIM);
   receiving an estimated SAL' for the NS based on virtual resources (VR) allocated by the VIM for satisfying the requested SAL; and
   propagating the estimated SAL (SAL') from a lower layer of the NFV-MANO towards an upper layer of the NFV-MANO and comparing the estimated SAL' with the requested SAL; and
   upon determining that the estimated SAL' does not satisfy the requested SAL, taking actions to meet the requested SAL, or upon determining that the estimated SAL' satisfies the requested SAL taking no further actions
wherein propagating the estimated SAL' further comprises the VIM providing estimated Virtual Resource Infrastructure Reliability Level, VR(IRL'), to a VNF manager (VNFM) and Virtual Link (VL) IRL, VL(IRL'), to the NFVO or propagating a minimum VR(IRL') and VL(IRL') to the VNFM and NFVO respectively.

17. A method, executed by a Network Function Virtualisation (NFV)-Management and Orchestration (MANO), for providing a requested Service Availability Level (SAL) for a Network Service (NS), comprising:
   at each of a plurality of layers of the NFV-MANO, mapping the requested SAL to a SAL that needs to be provided by a lower layer of the NFV-MANO;
   propagating the mapped requested SAL through interfaces between layers of the NFV-MANO, from an NFV Orchestrator (NFVO) towards a Virtualised Infrastructure Manager (VIM);
   receiving an estimated SAL' for the NS based on virtual resources (VR) allocated by the VIM for satisfying the requested SAL;
   propagating the estimated SAL (SAL') from a lower layer of the NFV-MANO towards an upper layer of the NFV-MANO and comparing the estimated SAL' with the requested SAL; and
   upon determining that the estimated SAL' does not satisfy the requested SAL, taking actions to meet the requested SAL, or upon determining that the estimated SAL' satisfies the requested SAL taking no further actions;
wherein propagating the estimated SAL' further comprises the NFVO estimating SAL of the NS, NS(SAL'), based on the VNF(SAL') provided by a VNF manager (VNFM) and on the VL(IRL') provided by the VIM.

18. The method of claim 17, wherein the NFVO estimates NS(SAL') using NS(SAL')=rev-func$^{NS}$(VNF(SAL') & VL(IRL')), and wherein rev-func$^{NS}$ is a reverse function or policy defined in an NS descriptor.

19. The method of claim 17, wherein propagating the estimated SAL' further comprises the NFVO providing the estimated NS(SAL') to an Operations Support System (OSS)/Business Support System (BSS) or propagating a minimum NS(SAL') to the OSS/BSS.

20. A system running a Network Function Virtualisation (NFV)-Management and Orchestration (MANO), for providing a requested Service Availability Level (SAL) for a Network Service (NS), comprising processing circuits and a memory, the memory containing instructions executable by the processing circuits whereby the system is operative to execute the method of claim 17.

21. A non-transitory computer readable media having stored thereon instructions for providing a requested Service Availability Level (SAL) for a Network Service (NS) through a Network Function Virtualisation (NFV)-Management and Orchestration (MANO), the instructions comprising the steps of the method of claim 17.

* * * * *